US008458718B2

(12) United States Patent
Hotra et al.

(10) Patent No.: US 8,458,718 B2
(45) Date of Patent: Jun. 4, 2013

(54) STATICALLY PARTITIONING INTO FIXED AND INDEPENDENT SYSTEMS WITH FIXED PROCESSING CORE

(75) Inventors: Jonathan N. Hotra, St. Louis, MO (US); Kenn R. Luecke, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 640 days.

(21) Appl. No.: 12/548,913

(22) Filed: Aug. 27, 2009

(65) Prior Publication Data

US 2011/0055518 A1    Mar. 3, 2011

(51) Int. Cl.
*G06F 9/46* (2006.01)
*G06F 9/455* (2006.01)
*G06F 15/173* (2006.01)
*G06F 15/16* (2006.01)

(52) U.S. Cl.
USPC ................ 718/104; 718/1; 709/226; 709/208

(58) Field of Classification Search
None
See application file for complete search history.

(56) References Cited

U.S. PATENT DOCUMENTS

| | | | |
|---|---|---|---|
| 5,802,178 A | 9/1998 | Holden et al. | |
| 6,067,620 A | 5/2000 | Holden et al. | |
| 6,304,973 B1 | 10/2001 | Williams | |
| 6,381,682 B2 | 4/2002 | Noel et al. | |
| 6,895,582 B1 * | 5/2005 | Greve | 718/1 |
| 7,069,437 B2 | 6/2006 | Williams | |
| 7,103,763 B2 | 9/2006 | Abbey et al. | |
| 7,277,404 B2 | 10/2007 | Tanzella et al. | |
| 7,293,175 B2 | 11/2007 | Brown et al. | |
| 7,356,695 B2 | 4/2008 | LiVecchi | |
| 7,386,698 B2 * | 6/2008 | Gimpl et al. | 711/173 |
| 7,565,522 B2 * | 7/2009 | Sastry et al. | 713/2 |
| 7,610,481 B2 | 10/2009 | Cool et al. | |
| 7,681,036 B1 | 3/2010 | Zuber et al. | |
| 7,721,292 B2 | 5/2010 | Frasier et al. | |
| 7,733,833 B2 | 6/2010 | Kalika | |
| 7,779,449 B2 | 8/2010 | Pham | |
| 7,865,893 B1 * | 1/2011 | Omelyanchuk et al. | 718/1 |
| 7,987,352 B2 | 7/2011 | Harikumar et al. | |
| 8,132,004 B2 | 3/2012 | Price | |

(Continued)

FOREIGN PATENT DOCUMENTS

| | | |
|---|---|---|
| EP | 0849680 A2 | 6/1998 |
| EP | 1318645 A2 | 6/2003 |
| GB | 2473136 B | 2/2010 |
| WO | 2009151854 A1 | 12/2009 |

OTHER PUBLICATIONS

Bialowas, "Achieving Business Goals with Wind River's Multicore Software Solution", Wind River, 2008, pp. 1-4 blogs.zdnet.com/perlow/images/multicoresoftwaresolution_0608-1.pdf.

(Continued)

*Primary Examiner* — Meng An
*Assistant Examiner* — Bing Zhao
(74) *Attorney, Agent, or Firm* — Yee & Associates, P.C.

(57) ABSTRACT

The different advantageous embodiments provide a system for partitioning a data processing system comprising a number of cores and a partitioning process. The partitioning process is configured to assign a number of partitions to the number of cores. Each partition in the number of partitions is assigned to a separate number of cores from the number of cores.

20 Claims, 5 Drawing Sheets

U.S. PATENT DOCUMENTS

| | | | |
|---|---|---|---|
| 2002/0010844 | A1 | 1/2002 | Noel et al. |
| 2004/0215948 | A1 | 10/2004 | Abbey et al. |
| 2006/0136761 | A1 | 6/2006 | Frasier et al. |
| 2006/0236365 | A1 | 10/2006 | Pham |
| 2007/0127417 | A1 | 6/2007 | Kalika |
| 2007/0239965 | A1 | 10/2007 | Lewites et al. |
| 2007/0250691 | A1 | 10/2007 | Cool et al. |
| 2007/0255942 | A1 | 11/2007 | Weller et al. |
| 2008/0059556 | A1* | 3/2008 | Greenspan et al. ........... 709/201 |
| 2009/0083734 | A1 | 3/2009 | Hotra |
| 2009/0144531 | A1 | 6/2009 | Harikumar et al. |
| 2010/0153749 | A1* | 6/2010 | Sakai ........................... 713/193 |

OTHER PUBLICATIONS

"ARINC 653 (ARINC 653-1)", LinuxWorks, retrieved Jul. 31, 2009, pp. 1-3 www.lynuxworks.com/solutions/milaero/arinc-653.php.

"Intel Research Advances 'Era of Tera'", Intel News Release, Feb. 11, 2007, pp. 1-3 intel.com/pressroom/archive/releases/20070204comp.htm.

"MILS: Multiple Independent Levels of Security", Objective Interface, retrieved Jul. 31, 2009, pp. 1-6 www.ois.com/products/MILS-Technical-primer.html.

Barham et al., "Xen and the Art of Virtualization", SOSP'03 Oct. 2003, Bolton Landing NY, ACM pp. 1-14.

Adams et al., "A Comparison of Software and Hardware Techniques for x86 Virtualization", ASPLOS'06, Oct. 2006, San Jose CA, 2006 ACM, pp. 1-12.

U.S. Appl. No. 12/137,668, filed Jun. 12, 2008, Price.

GB Examination Report dated Oct. 17, 2011 regarding application No. GB1014385.7, reference P5037GB/AER, applicant The Boeing Company, 2 Pages.

PCT Search Report with Written Opinion dated Nov. 17, 2009 regarding international application No. PCT/US2009/043563, applicant's reference, applicant The Boeing Company, 14 pages.

USPTO Office Action dated Jan. 14, 2011 for U.S. Appl. No. 12/137,668, 16 pages.

USPTO Office Action dated Jun. 17, 2011 for U.S. Appl. No. 12/137,668, 12 pages.

USPTO Notice of Allowance dated Nov. 18, 2011 for U.S. Appl. No. 12/137,668, 9 pages.

Intellectual Property Office Combined Search and Examination Report, dated Nov. 24, 2010, regarding Application No. GB1014385.7 (GB2473136), 9 pages.

* cited by examiner

STATICALLY PARTITIONING INTO FIXED AND INDEPENDENT SYSTEMS WITH FIXED PROCESSING CORE

BACKGROUND INFORMATION

1. Field

The present disclosure relates generally to aircraft and in particular to aircraft data processing systems. Still more particularly, the present disclosure relates to a method and apparatus for an aircraft data processing system with a multi-core processor.

2. Background

As Software has become a standard method for control of devices, there has been an increased effort in determining the safety and security levels at which the software operates. Many authorities exist to provide certifications that software operates at a given safety or security level. Safety certifications are used to test, verify, and validate that software performs as stated per system requirements. Security certification of software mitigates application vulnerability to undesirable influences and unauthorized access.

Certification of software is an expensive proposition. In the case of flight critical software, the Federal Aviation Administration (FAA) encourages the use of the Radio Technical Commission for Aeronautics (RTCA) DO-178B guideline for certification. It has been shown that it costs up to one hundred dollars per line of code to certify software at the DO-178B Level A criterion. The expense is even greater for security certifications. For security certifications of Evaluation Assurance Level (EAL) Level 7, it has been estimated that the cost is around one thousand dollars per line of code.

The concept of Mixed Criticality presents another problem with certified software. If there is no way to guarantee that software at different safety or security levels cannot interact with each other, then all software must be certified at the highest safety or security level. This can greatly increase the certification cost of a product.

Typically, a combination of hardware and software partitions are used to guarantee safety and security of software used on a platform. Ideally the partitions would be created with the least amount of software necessary to help guarantee safety and security of the system. Reduced software size leads to reduced certification and system development costs and faster time for certification completion.

Therefore, it would be advantageous to have a method and apparatus that overcomes one or more of the issues described above as well as possibly other issues.

SUMMARY

The different advantageous embodiments provide a system for partitioning a data processing system comprising a number of cores and a partitioning process. The partitioning process is configured to assign a number of partitions to the number of cores. Each partition in the number of partitions is assigned to a separate number of cores from the number of cores.

The different advantageous embodiments further provide a method for partitioning a data processing system. In response to detecting a start-up of the data processing system, a configuration profile is identified for the data processing system. The data processing system is partitioned based on the configuration profile to form a number of partitions within the data processing system. A number of resources is allocated to the number of partitions based on the configuration profile. Control of the data processing system is released until a next system start.

The different advantageous embodiments further provide a method for partitioning a data processing system having a plurality of cores. A start-up of the data processing system is detected. The data processing system is partitioned to form a number of partitions assigned to a number of cores from the plurality of cores within the data processing system. A number of resources is allocated to the number of partitions. Control of the data processing system is released until a next system start up.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
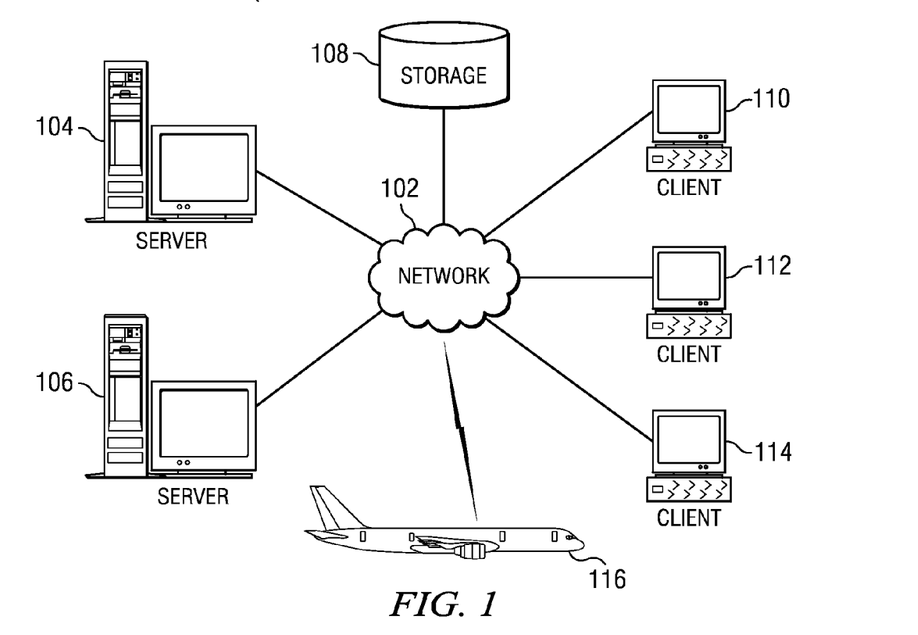
FIG. 1 is a pictorial representation of a network of data processing systems in which the advantageous embodiments may be implemented.
Figure 2:
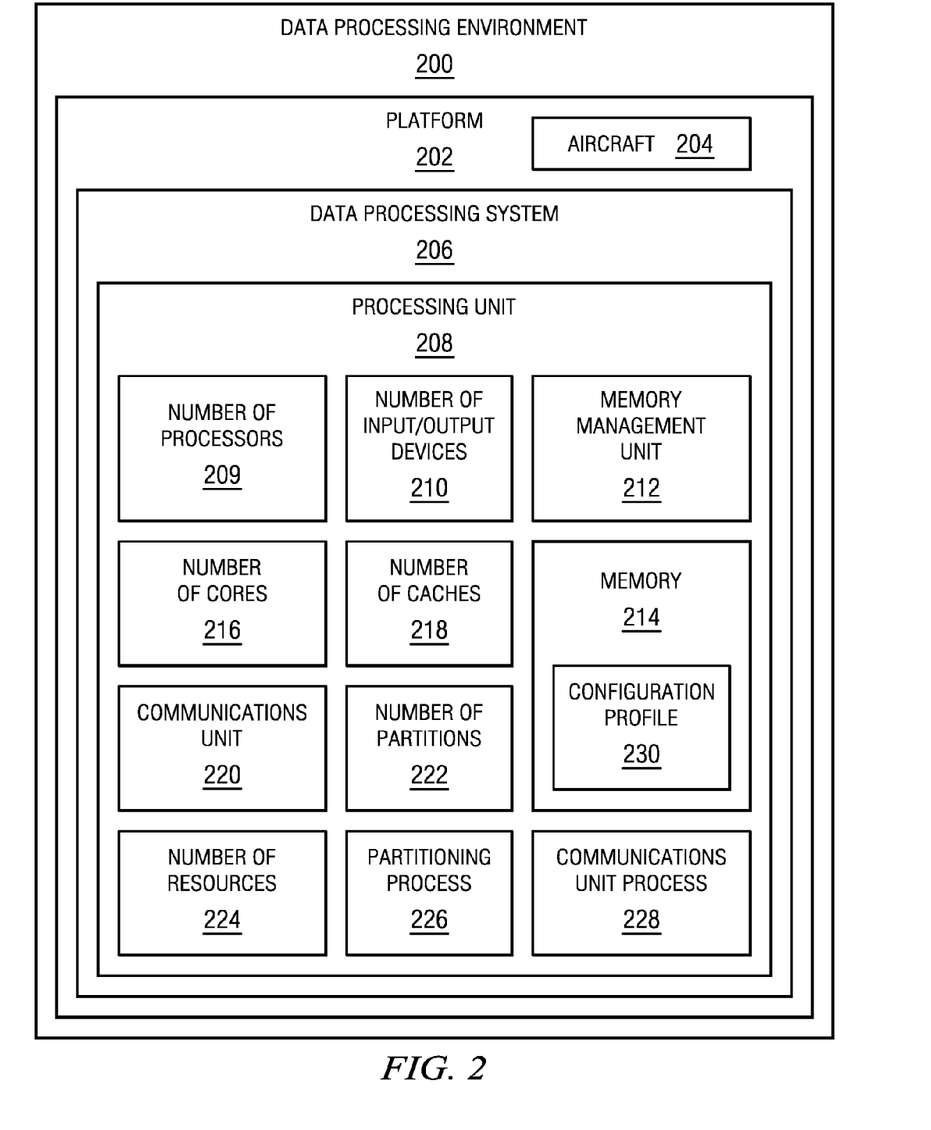
FIG. 2 is an illustration of a data processing environment in accordance with an advantageous embodiment.

With reference now to the figures and in particular with reference to FIGS. 1-2, exemplary diagrams of data processing environments are provided in which the advantageous embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the advantageous embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. Aircraft 116 may exchange data with different computers through a wireless communications link while in-flight or any other type of communications link while on the ground. In these examples, server 104, server 106, client 110, client 112, and client 114 may be computers. Network data processing system 100 may include additional servers, clients, and other devices not shown. A data processing system in aircraft 116 may be implemented using one or more of the different advantageous embodiments, for example.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, an illustration of a data processing environment is depicted in accordance with an advantageous embodiment. Data processing environment 200 is an example of a data processing environment that may be used to implement servers and clients, such as server 104 and client 110. Further, data processing environment 200 is an example of a data processing environment that may be found in aircraft 116 in FIG. 1.

In this illustrative example, data processing environment 200 may be implemented using platform 202. Platform 202 may be any type of platform, including, without limitation, aircraft 204. Aircraft 204 may be an example of one implementation of aircraft 116 in FIG. 1. Platform 202 includes data processing system 206. Data processing system 206 may include a number of computers in a network environment, such as network 102 in FIG. 1, for example. In this illustrative example, data processing system 206 includes processing unit 208.

Processing unit 208 may be implemented using number of processors 209. Number of processors 209 may be located on a single hardware platform, such as, without limitation, a chip multiprocessor, a System on a Chip (SoC) field-programmable gate array (FPGA), an application-specific integrated circuit (ASIC), a hybrid FPGA-ASIC, multiple processors with cores, multi-core processor, and/or any other suitable platform. In another advantageous embodiment, a number of other processors in addition to number of processors 209 located on a single hardware platform may be present in processing unit 208.

Processing unit 208 may include, without limitation, number of input/output devices 210, memory management unit 212, memory 214, number of cores 216, number of caches 218, communications unit 220, number of partitions 222, number of resources 224, partitioning process 226, and communications unit process 228. Number of input/output devices 210 allow for input and output of data between different resources of processing unit 208 and/or with other devices that may be connected to processing unit 208. For example, number of input/output devices 210 may provide communication between number of partitions 222 and/or other subsystem computers of data processing system 206. Further, number of input/output devices 210 may send output to a printer or other external device, for example.

Memory management unit 212 routes access to memory 214 for each core in number of cores 216 to a specific portion of memory 214. Memory management unit 212 may provide virtual memory for number of partitions 222. Each partition in number of partitions 222 is restricted to its own virtual memory in memory 214, and can not access another partition's virtual memory. Memory management unit 212 may also manage memory hierarchy for memory 214 in processing unit 208.

Memory hierarchy creates the illusion of unlimited memory for a partition by taking advantage of the principle of locality. The principle of locality refers to the same data storage locations in the memory space being frequently accessed. In other words, the collection of the data storage locations referenced in a short period of time in a running computer often consists of relatively well predictable clusters.

A memory hierarchy may be created to take advantage of locality. The memory hierarchy may have multiple levels. In one illustrative example, the highest level in the hierarchy is caches. Caches are the fastest memory found closest to the core. There may also be multiple levels of static random access memory (SRAM) cache memory. The next level in the hierarchy may be the slower main memory, which is implemented in dynamic random access memory (DRAM). The lowest level in the hierarchy may be, for example, without limitation, a hard disk, CD-rom, DVD-rom, and/or non-volatile memory, such as flash. A memory hierarchy may be implemented using one or more of the levels described above.

Virtual memory may be created to allow partitions, programs, operating systems, and other suitable components, to exceed the size of the main memory (DRAM). In one illustrative example, software is broken into pieces and paged back and forth out of main memory when a page is required by a piece of software. Pages not currently being used are stored in the lowest level of the memory hierarchy, such as a hard drive, for example. The mapping between virtual memory and physical main memory is stored in a page table, which in turn is stored in main memory (DRAM). These page tables may also be cached in a special cache called a Translation Lookaside Buffer (TLB), which resides in memory management unit 212, for example.

In another illustrative example of a non-virtualized system, an operating system may manage the virtual memory and the page tables. Memory management unit 212 provides hardware protection over memory pages for the operating system in this example. The hardware protections are used to allow multiple processes to run on the system and inhibit each process from reading or writing over other processes' memory. The operating system in this example may also handle management of the memory hierarchy where it is not automated by hardware.

In yet another illustrative example of a virtualized system, multiple operating systems may manage the page tables. A hypervisor may be used to give the operating systems the illusion that they have complete control over memory management unit 212 and the page tables where there is no hardware virtualization support available on memory management unit 212. The hypervisor actually controls the physical memory management unit 212. For each operating system on processing unit 208 in this example, a shadow cache is maintained. When an operating system attempts to modify the page tables, the activity is trapped and managed by the hypervisor to map the shadow cache entry to the actual Translation Lookaside Buffer (TLB). In an advantageous embodiment, physical partitions may be created using virtualization hardware and, if necessary, a hypervisor with shadow caches to provide memory protection for a partitioned system.

Memory 214 may be any type of storage device. A storage device is any piece of hardware that is capable of storing information, such as, for example without limitation, data, program code in functional form, and/or other suitable information either on a temporary basis and/or a permanent basis. Memory 214, in these examples, may be, for example, a random access memory, persistent storage, or any other suitable volatile or non-volatile storage device. Memory 214 may include configuration profile 230. Configuration profile 230 is a file that includes instructions for partitioning processing unit 208 and allocating resources to number of partitions 222. Configuration profile 230 may be a file encoded in a format, such as, without limitation, American Standard Code for Information Interchange (ASCII), Unicode Text, Extensible Markup Language (XML), and/or any other suitable binary file, for example.

Number of cores 216 is a plurality of independent cores, such as in a multi-core system, for example. As used herein, plurality of cores refers to two or more cores. A core may be, for example, without limitation, a central processing unit, digital signal processor, intellectual property core, and/or any other suitable type of core. A multi-core system may include, without limitation, a dual-core processor, a quad-core processor, and/or any other suitable multi-core processor implemented in a single physical package.

Number of caches 218 are a number of blocks of memory used for temporary storage. Frequently accessed data can be stored in number of caches 218 for rapid access, as opposed to slower access for original data stored in memory 214. As used herein, number of caches refers to one or more caches.

Communications unit 220 provides internal communications for the partitioned processing unit 208. In one illustrative example, if the physical input/output devices of number of input/output devices 210 are routed directly to number of partitions 222, no physical communication links are needed in communications unit 220. In another illustrative example, if communications unit 220 manages a number of physical input/output devices, input/output traffic in the partitioned system may be routed through an internal communication bus of communications unit 220 and be forwarded to and from the real hardware in communications unit 220. Communications unit 220, in these examples, may be, without limitation, a network interface card, virtual Ethernet, a communications fabric or bus, or any other suitable type of communications unit. Communications unit 220 may provide communications between number of partitions 222 through the use of shared memory and/or virtual Ethernet, for example.

Number of partitions 222 are hardware partitions across number of cores 216 of processing unit 208. As used herein, number of refers to one or more items. Each partition in number of partitions 222 contains one or more cores of number of cores 216. In other words, each partition has its own core or cores. Each partition in number of partitions 222 may also have its own cache from number of caches 218.

Number of resources 224 may include, without limitation, memory, applications, operating systems, supervisors, hypervisors, kernels, internal communication channels, external communication channels, drivers, and/or any other suitable resource.

Partitioning process 226 is initiated at system startup of processing unit 208. Partitioning process 226 partitions processing unit 208 into number of partitions 222, where each partition of number of partitions 222 contains its own core or cores from number of cores 216. Number of resources 224 are then allocated to each partition of number of partitions 222, and the resources are initiated to start up. Each partition in number of partitions 222 operate independently from one another once partitioned. In an advantageous embodiment, partitioning process 226 releases control of the overall system once partitioning is complete until a next system start up is detected. In an illustrative example, communications unit 220, partitioning process 226, and/or communications unit process 228 may reside on the same core in number of cores 216.

Communications unit process 228 manages communication between number of partitions 222 over communications unit 220. In one advantageous embodiment, partitioning process 226 may identify inter-partition communication needs in configuration profile 230. Partitioning process 226 may transfer control of the core or cores on which partitioning process 226 is running to communications unit process 228 if inter-partition communication needs identified require communications unit process 228. The partition of the core or cores on which partitioning process 226 is running may be reserved for communications unit process 228 in this example, forming a reserved partition. In one illustrative example, the inter-partition communication may be shared memory, in which case communications unit process 228 may not be needed. In another illustrative example, the inter-partition communication may require virtual Ethernet. In the example of virtual Ethernet requirements for inter-partition communications, communications unit process 228 may assume control of the core or cores on which partitioning process 226 is running in order to move the virtual Ethernet around the system. In some advantageous embodiments, a hypervisor may be implemented in the reserved partition where there is no hardware virtualization support available on memory management unit 212.

In another advantageous embodiment, no inter-partition communications needs may be identified in configuration profile 230. If no inter-partition communication is identified, partitioning process 226 may idle the core or cores on which partitioning process 226 is running, in one illustrative example.

The illustration of data processing environment 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

The different advantageous embodiments recognize and take into account a number of different considerations. For example, the different advantageous embodiments recognize and take into account that currently used methods utilize Aeronautical Radio, Incorporated (ARINC) 653 and DO-178B operating systems to achieve the required safety certification level for aircraft systems. Security certifications use separation kernels to meet their certification requirements. The method of using the ARINC 653, DO-178B operating systems, and separation kernels provide a software partitioning operating system that allows software running at different certification levels to be separated. The software partitioning operating system itself has to be certified, however, leading to increased expense in developing the partitioned system.

The different advantageous embodiments further recognize and take into account that currently used methods fail to take advantage of the multi-core systems now available, because the software partitioning is directed to partition a single core into multiple partitions. Additionally, currently used methods fail to take advantage of hardware virtualization technologies when using multi-core systems.

Thus, the different advantageous embodiments provide a system for partitioning a data processing system comprising a number of cores and a partitioning process. The partitioning process is configured to assign a number of partitions to the number of cores. Each partition in the number of partitions is assigned to a separate number of cores from the number of cores.

The different advantageous embodiments further provide a method for partitioning a data processing system. In response to detecting a start-up of the data processing system, a configuration profile is identified for the data processing system. The data processing system is partitioned based on the configuration profile to form a number of partitions within the data processing system. A number of resources is allocated to the number of partitions based on the configuration profile. Control of the data processing system is released until a next system start up.

The different advantageous embodiments further provide a method for partitioning a data processing system having a plurality of cores. A start-up of the data processing system is detected. The data processing system is partitioned to form a number of partitions assigned to a number of cores from the plurality of cores within the data processing system. A number of resources is allocated to the number of partitions. Control of the data processing system is released until a next system start up.

Figure 3:
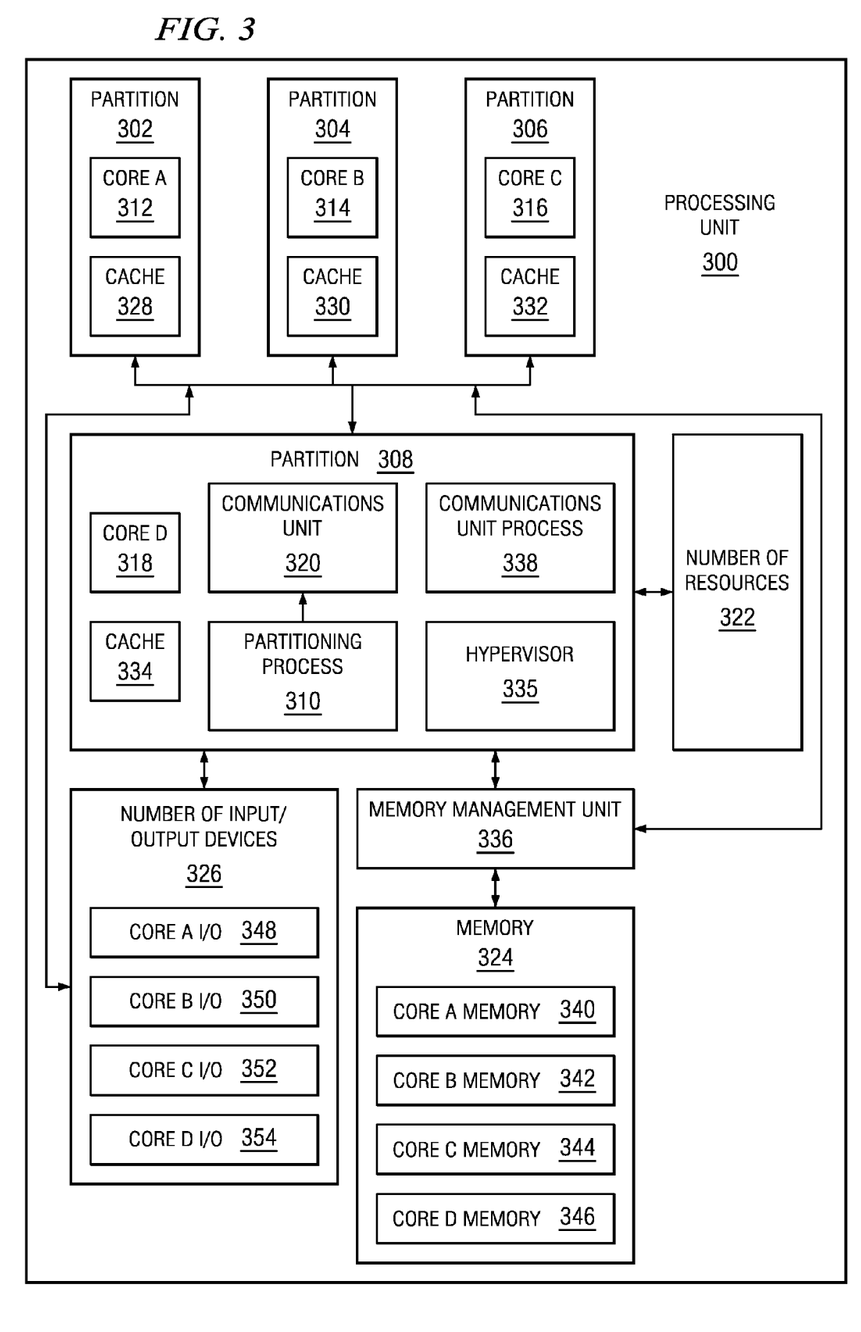
FIG. 3 is an illustration of a processing unit in accordance with an advantageous embodiment.

With reference now to FIG. 3, an illustration of a processing unit is depicted in accordance with an advantageous embodiment. Processing unit 300 may be an illustrative example of one implementation of processing unit 208 in FIG. 2.

Processing unit 300 includes partition 302, partition 304, partition 306, and partition 308. Partition 302, partition 304, partition 306, and partition 308 may be an illustrative example of one implementation of number of partitions 222 in FIG. 2. Partition 308 includes partitioning process 310. Partitioning process 310 may be an example of partitioning process 226 in FIG. 2.

In this illustrative example, partitioning process 310 assigns each partition of processing unit 300 to one or more core resources. Partition 302 is assigned core A 312. Partition 304 is assigned core B 314. Partition 306 is assigned core C 316. Partition 308 is assigned core D 318. Partition 308 may be reserved by partitioning process 310 for communications unit 320. Communications unit 320 may be an example of one implementation of communications unit 220 in FIG. 2.

In addition, partitioning process 310 allocates resources from number of resources 322, memory 324, and number of input/output devices 326 to each partition of partition 302, partition 304, partition 306, and partition 308. Number of resources may include, for example, without limitation, memory, applications, operating systems, supervisors, hypervisors, kernels, internal communication channels, external communication channels, drivers, and/or any other suitable resource.

In one illustrative example, where memory hardware virtualization is used, partitioning process 310 allocates translation lookaside buffer (TLB) cache memory to the partitions of processing unit 300. In this example, each partition has its own cache. Partition 302 includes cache 328, partition 304 includes cache 330, partition 306 includes cache 332, and partition 308 includes cache 334. Partitioning process 310 may allocate TLB cache memory based on the processing and/or memory requirements of the resources allocated to a particular partition, for example.

In another illustrative example, hypervisor 335 is used to create shadow caches for each partition. Partitioning process 310 may allocate shadow caches to each partition of processing unit 300. In this example, each partition has its own shadow cache managed by hypervisor 335.

Partitioning process 310 may be implemented, for example, without limitation, by a bootloader. A bootloader loads partitioning process 310 for processing unit 300 at start up, or boot up, and initiates a set of operations for processing unit 300. Partitioning process 310 defines static partitions at startup, such as partition 302, partition 304, partition 306, and partition 308, for example. Static partitions are partitions that do not change during system operation, or in other words, are not dynamic. Once the partitions have been defined during startup, they remain static throughout the system operations until a next startup is detected and partitioning process 310 is activated to define partitions again. Partitioning process 310 may reserve a partition, such as partition 308 for example, for communications unit 320 at startup, which provides for communication between partition 302, partition 304, partition 306, and partition 308 during system operations of processing unit 300. Communications unit process 338 may also run on partition 308 in order to manage inter-partition communications using communications unit 320. Communications unit process 338 may be an example of one implementation of communications unit process 228 in FIG. 2.

Memory management unit 336 routes the memory access for each of core A 312, core B 314, core C 316, and core D 318 to a specific portion of memory 324. In an illustrative example, memory 324 may route to core A 312 to Core A memory 340, core B 314 to core B memory 342, core C 316 to core C memory 344, and core D 318 to core D memory 346.

Number of input/output devices 326 may also be allocated during partitioning by partitioning process 310. Each input/output device may be dedicated to a specific partition of partition 302, partition 304, partition 306, and partition 308, for example. In one illustrative example, partitioning process 310 may allocate number of input/output devices 326 so that each of partition 302, partition 304, partition 306, and partition 308 has its own individual input/output devices. In this example, number of input/output devices 326 may include Core A input/output device 348, core B input/output device 350, core C input/output device 352, and core D input/output device 354.

The illustration of processing unit 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in one advantageous embodiment, processing unit 300 may include cores in addition to core A 312, core B 314, core C 316, and core D 318. In another advantageous embodiment, processing unit 300 may have two partitions, such as partition 302 and partition 304, and each of the two partitions may be assigned to two or more independent cores. In yet another advantageous embodiment, communications unit 320 and partitioning process 310 may be implemented on the same partition, such as partition 308 assigned to core D 318, for example.

In another example of an advantageous embodiment, each partition may be routed to two or more individual input/output devices in number of input/output devices 326. In one advantageous embodiment, a partition may have more than one dedicated input/output device. In another advantageous embodiment, a partition may not be routed to any input/output devices.

Figure 4:
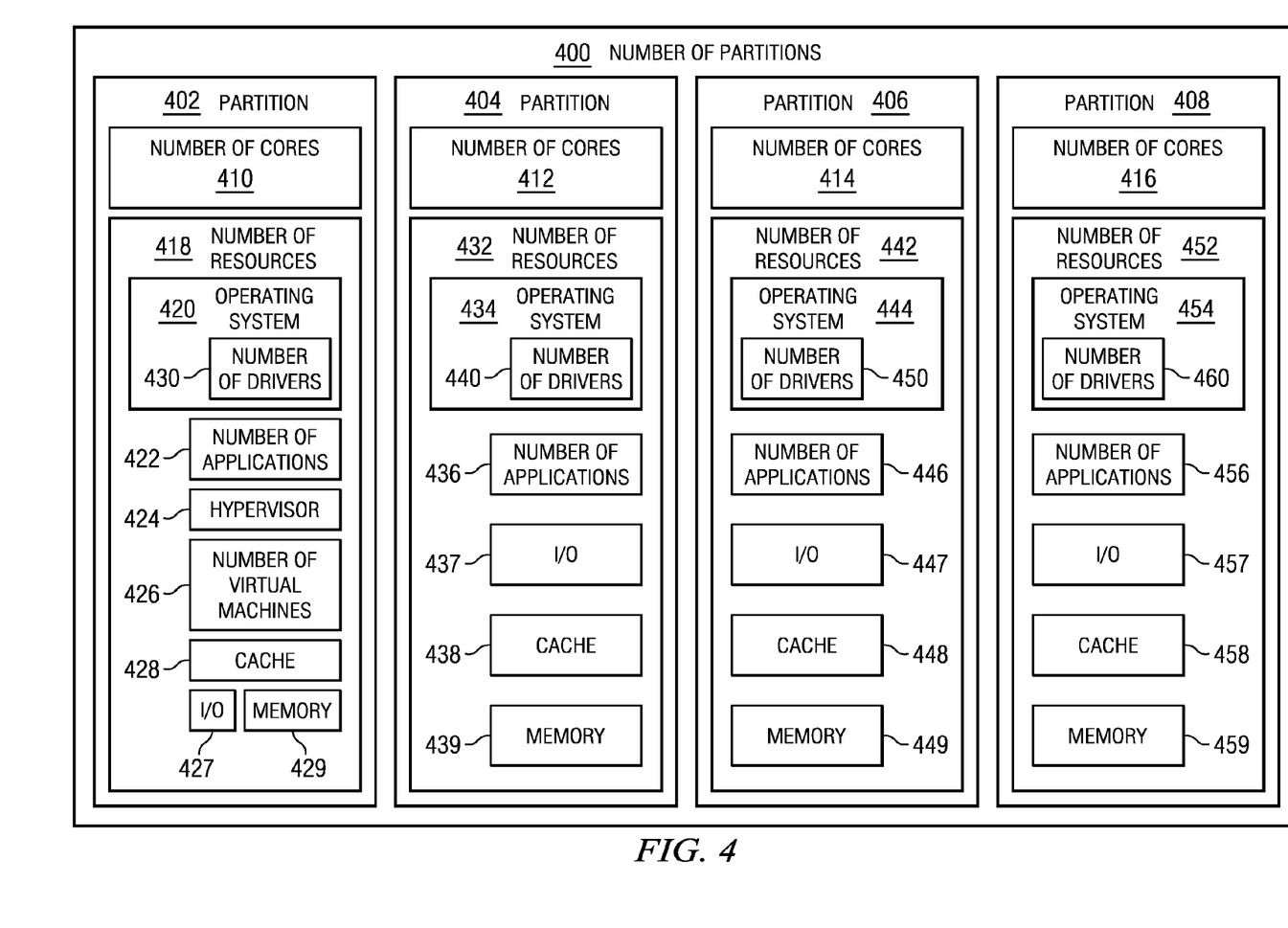
FIG. 4 is an illustration of a number of partitions in accordance with an advantageous embodiment.

With reference now to FIG. 4, an illustration of a number of partitions is depicted in accordance with an advantageous embodiment. Number of partitions 400 may be an illustrative example of one embodiment of number of partitions 222 in FIG. 2. Number of partitions 400 may also be an illustrative example of one embodiment of partitions illustrated in FIG. 3, such as partition 302, partition 304, partition 306, and partition 308, for example.

Number of partitions 400 includes partition 402, partition 404, partition 406, and partition 408. Number of partitions 400 may be assigned to a number of cores. As used herein, number of cores refers to one or more cores. Partition 402 may be assigned to number of cores 410. Partition 404 may be assigned to number of cores 412. Partition 406 may be assigned to number of cores 414. Partition 408 may be assigned to number of cores 416. Number of cores 410, 412, 414, and 416 may be an illustrative example of one implementation of number of cores 216 in FIG. 2. The core or cores to which a partition is assigned are exclusive to that partition. In other words, number of cores 410 are independent from number of cores 412, 414, and 416, number of cores 412 are independent from number of cores 410, 414, and 416, and so on.

Each partition may include a number of resources allocated at system startup by a partitioning process, such as partitioning process 310 in FIG. 3, for example. Partition 402 includes number of resources 418. Number of resources 418 may include, for example, without limitation, operating system 420, number of applications 422, hypervisor 424, number of virtual machines 426, cache 428, input/output 427, and memory 429. Operating system 420 may include number of drivers 430. Number of drivers 430 may be the specific drivers for the number of input/output devices assigned to partition 402 during startup by the partitioning process, for example. As a result, input/output requests and external communications are routed directly to partition 402 from the number of input/output devices assigned to partition 402, in this example.

In one illustrative example, number of applications 422 may run on operating system 420. In another illustrative example, number of applications 422 may require no operating system 420. Cache 428 may be a block of memory used for temporary storage by partition 402. Frequently accessed data can be stored in cache 428 for rapid access, as opposed to slower access for routing to data in memory, such as memory 324 in FIG. 3, for example.

Partition 404 includes number of resources 432. Number of resources 432 may include, for example, without limitation, operating system 434, number of applications 436, cache 438, input/output 437, and memory 439. Operating system 434 may include number of drivers 440, in this example. Partition 406 includes number of resources 442. Number of resources 442 may include, for example, without limitation, operating system 444, number of applications 446, cache 448, input/output 447, and memory 449. Operating system 444 may include number of drivers 450, in this example. Partition 408 includes number of resources 452. Number of resources 452 may include, for example, without limitation, operating system 454, number of applications 456, cache 458, input/output 457, and memory 459. Operating system 454 may include number of drivers 460, in this example.

The illustration of number of partitions 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in one advantageous embodiment, number of drivers 430 may be independent from operating system 420 in partition 402. In another advantageous embodiment, partition 404, partition 406, and/or partition 408 may also include a hypervisor and number of virtual machines, such as hypervisor 424 and number of virtual machines 426 of partition 402.

Figure 5:
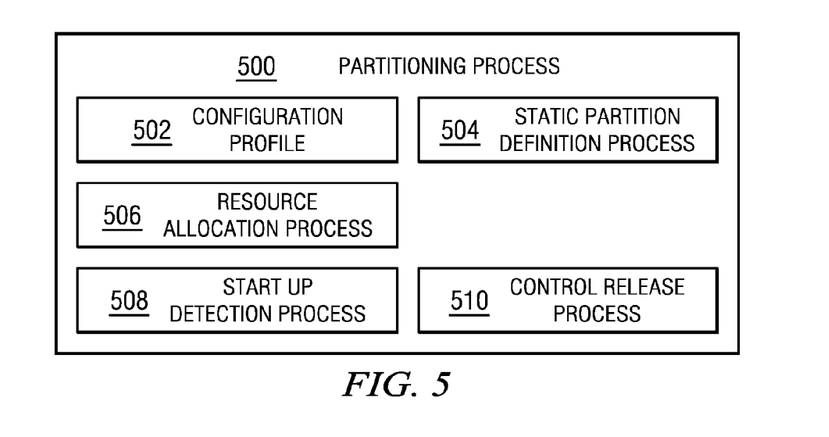
FIG. 5 is an illustration of a partitioning process in accordance with an advantageous embodiment.

With reference now to FIG. 5, an illustration of a partitioning process is depicted in accordance with an advantageous embodiment. Partitioning process 500 may be an illustrative example of one implementation of partitioning process 310 in FIG. 3.

Partitioning process 500 includes configuration profile 502, static partition definition process 504, resource allocation process 506, start up detection process 508, and control release process 510. Configuration profile 502 is a file stored in memory, such as configuration profile 230 in memory 214 in FIG. 2, for example. Configuration profile 502 includes instructions for static partition definition process 504 and resource allocation process 506.

In one illustrative example, configuration profile 502 may include partitioning instructions as follows:
  Partition 0: Number of cores=1, memory=10 MB, I/O=Ethernet, Inter-Partition Communication Channel A.
  Partition 1: Number of cores=2, memory=100 MB, I/O=Ethernet, Inter-Partition Communication Channel A, Inter-Partition Communication Channel B.
  Partition 2: Number of cores=1, memory=1000 MB, I/O=USB, Inter-Partition Communication Channel B.

Resource allocation process 506 allocates a number of resources, such as number of resources 322 in FIG. 3, to a number of partitions, such as number of partitions 222 in FIG. 2, during start up of a data processing system. Resource allocation process 506 allocates resources so that each partition has its own individual resources. Resources are not shared across multiple partitions, except for inter-partition communication channels when required.

In an illustrative example, an inter-partition communication channel may be shared when a process running in one partition needed to signal a process running in another partition and provide data along with the signal to the process running in the other partition. In another illustrative example, an inter-partition communication channel may be shared in a mixed criticality level partitioned system having only one communication channel available to all partitions.

Start up detection process 508 detects the start up, or booting up, of a data processing system and initiates static partitioning process 500 to identify configuration profile 502 and execute static partition definition process 504 and resource allocation process 506.

Control release process 510 stops static partitioning process 500 from running after static partition definition process 504 and resource allocation process 506 have executed and the partitioning process is complete. Once control release process 510 stops static partitioning process 500, static partitioning process 500 is not activated again until start up detection process 508 detects the next system start up. A communications unit process, such as communications unit process 228 in FIG. 2, may start up to handle inter-partition communications if needed, as identified by partitioning process 500 using configuration profile 502.

Figure 6:
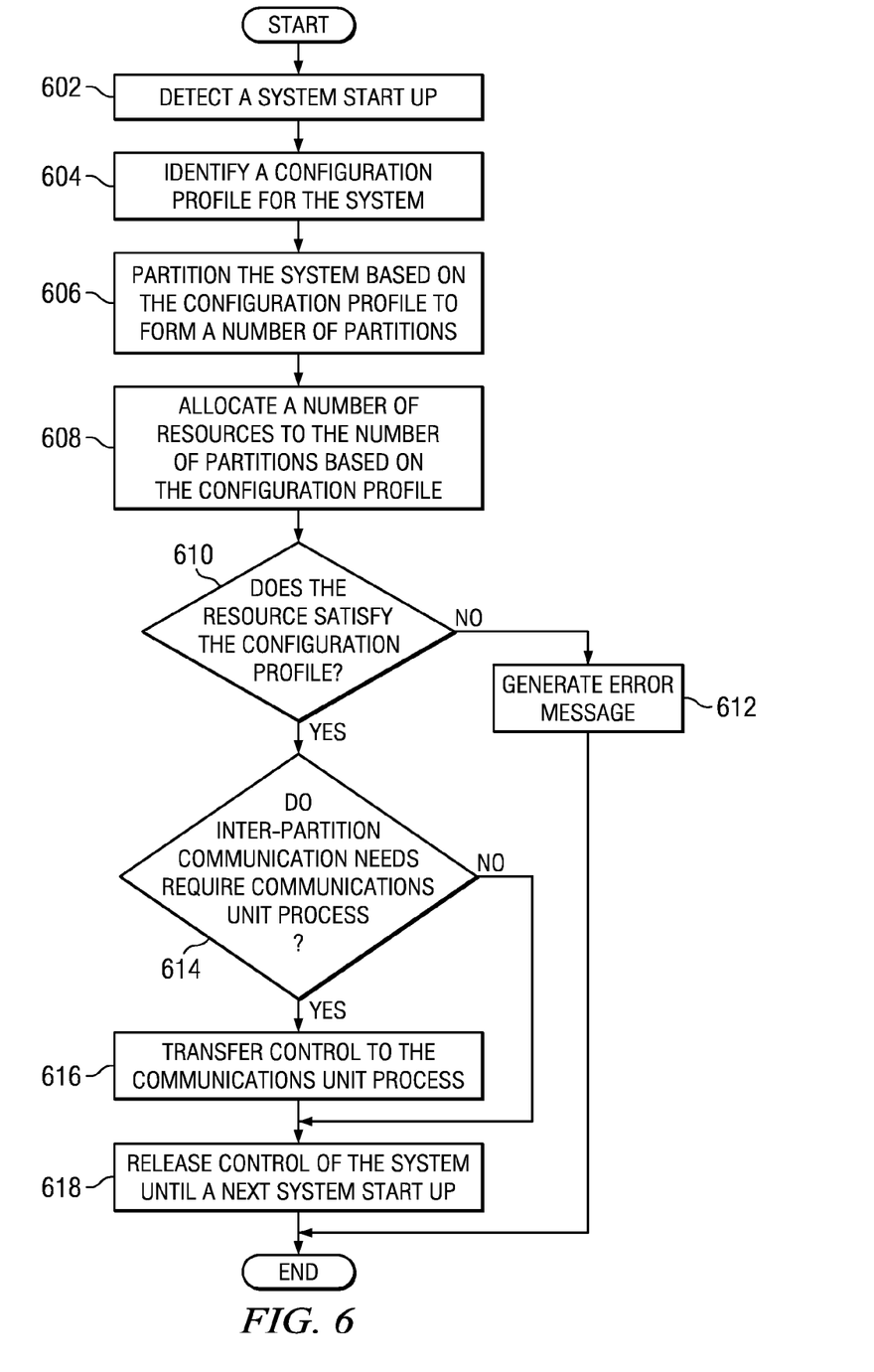
FIG. 6 is an illustration of a process for partitioning a system in accordance with an advantageous embodiment.

With reference now to FIG. 6, an illustration of a process for partitioning a system is depicted in accordance with an advantageous embodiment. The process illustrated in FIG. 6 may be implemented by a component such as static partitioning process 500 in FIG. 5, for example.

The process begins by detecting a system start up (operation 602). The detection of a system start up, or booting up, may be performed using start up detection process 508 in FIG. 5, for example. Detection of a system start up may be, for example, power applied to the system. Next, the process identifies a configuration profile for the system (operation 604). The process then partitions the system based on the configuration profile to form a number of partitions (operation 606). The process allocates a number of resources to the number of partitions based on the configuration profile (operation 608). The number of resources may include a number of input/output devices, such as number of input/output devices 210 in FIG. 2. The number of input/output devices may also be assigned to specific partitions in the number of partitions, so that each partition has different input/output devices.

The process then determines whether the resource allocation satisfies the configuration profile identified for the system (operation 610). If the requested resources for one or more partitions are not available to be allocated to the partitions as specified in the configuration profile, the process generates an error message (operation 612), and then the process terminates. The error message may be sent out over an input/output device, for example, for display on a device such as a monitor. A user may be required to change the configuration profile to accommodate for the error message, and reload the changed configuration profile into the system and initiate a reboot of the data processing system, for example.

If the configuration profile is satisfied, the process then determines whether inter-partition communication needs require a communications unit process (operation 614). The inter-partition communication needs may be identified using the configuration profile identified for the system in operation 604, for example. If a determination is made that the communications unit process is required, the process transfers control of the core or cores it is currently running on to the communications unit process (operation 616). The process then releases control of the system until a next system start up (operation 618), with the process terminating thereafter. If a determination is made that the communications unit process is not required, the process proceeds directly to operation 618.

Releasing control of the system may include idling the core or cores the process is currently running on, for example. Releasing control of the system may also include starting up another partition on the core or cores the partitioning process is running on after partitioning is complete and if no communications unit or hypervisor is required. Releasing control of the system results in no operating system or hypervisor scheduling activities occurring on the system. Each partition operates independently as if each partition is on a separate physical computer. Configuration of the system does not occur again until a reboot or cycling of power.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method performed by a partitioning process for partitioning a data processing system, the method comprising;
   responsive to detecting a start-up of the data processing system, identifying a configuration profile for the data processing system;
   partitioning the data processing system based on the configuration profile to form a number of partitions within the data processing system, wherein each of the number of partitions is a static partition that does not change during operation of the data processing system;
   assigning each partition of the number of partitions exclusively to a separate number of cores from a plurality of cores of a processing unit;
   allocating a number of resources of the data processing system to the number of partitions based on the configuration profile; and
   releasing control of the data processing system to a communications unit process until a next system start up of the data processing system, wherein the communications unit process is configured to manage inter-partition communication between the number of partitions, and the releasing control of the data processing system results in no operating system or hypervisor scheduling activities occurring on the data processing system so that each partition operates independently as if each partition is on a separate physical computer.

2. The method of claim 1, wherein partitioning the system further comprises:
   assigning a number of input/output devices to the number of partitions, wherein each partition in the number of partitions is assigned a different input/output device in the number of input/output devices.

3. The method of claim 2, wherein a number of interrupt requests from an input/output device are routed to a partition in the number of partitions based on the input/output device assignment.

4. The method of claim 1, further comprising:
   reserving a partition in the number of partitions for a communications unit.

5. The method of claim 4, wherein the communications unit is configured to route communications between the number of partitions.

6. The method of claim 1, wherein configuration of the data processing system does not occur again until one of a reboot or a cycling of power of the data processing system.

7. The method of claim 1, wherein the number of resources comprises a hypervisor and a number of virtual machines.

8. The method of claim 1, wherein the number of partitions comprises a hypervisor and a number of virtual machines.

9. The method of claim 1, wherein each partition of the number of partitions is a hardware partition.

10. A system for partitioning a data processing system, the system comprising:
    a number of cores of a processing unit;
    a partitioning process configured to:
       responsive to detecting a start-up of the data processing system, identify a configuration profile for the data processing system;
       partition the data processing system based on the configuration profile to form a number of partitions within the data processing system;
       assign a number of partitions to the number of cores, each partition in the number of partitions assigned exclusively to a separate number of cores from the number of cores;
       allocate a number of resources of the data processing system to the number of partitions based on the configuration profile; and
       release control of the data processing system to a communications unit process until a next system start up of the data processing system, wherein the communications unit process is configured to manage inter-partition communication between the number of partitions, and the releasing control of the data processing system results in no operating system or hypervisor scheduling activities occurring on the data processing system so that each partition operates independently as if each partition is on a separate physical computer; and
    the configuration profile having instructions for the partitioning of the data processing system into the number of partitions and the allocating of the number of resources of the data processing system to the number of partitions, wherein each of the number of partitions is a static partition that does not change during operation of the data processing system.

11. The system of claim 10, wherein the partitioning process reserves a partition in the number of partitions for the communications unit.

12. The system of claim 10, wherein the partitioning process releases control of the data processing system to the communications unit process after partitioning the data processing system at startup.

13. The system of claim 10, wherein the partitioning process further allocates a number of resources to the number of partitions, each partition in the number of partitions having a separate number of resources from the number of resources.

14. The system of claim 10, wherein configuration of the data processing system does not occur again until one of a reboot or a cycling of power of the data processing system.

15. The system of claim 10, wherein the number of resources comprises a hypervisor and a number of virtual machines.

16. The system of claim 10, wherein the number of partitions comprises a hypervisor and a number of virtual machines.

17. The system of claim 10, wherein each partition of the number of partitions is a hardware partition.

18. A method performed by a partitioning process for partitioning a data processing system having a plurality of cores of a processing unit, the method comprising:
- responsive to detecting a start-up of the data processing system, identifying a configuration profile for the data processing system;
- partitioning the data processing system based on a configuration profile to form a number of partitions assigned to a number of cores from the plurality of cores within the data processing system, wherein each of the number of partitions is a static partition that does not change during operation of the data processing system;
- assigning a separate number of cores from the plurality of cores exclusively to each partition of the number of partitions;
- allocating a number of resources of the data processing system to the number of partitions based on the configuration profile; and
- releasing control of the data processing system to a communications unit process until a next system start up of the data processing system, wherein the communications unit process is configured to manage inter-partition communication between the number of partitions, and the releasing control of the data processing system results in no operating system or hypervisor scheduling activities occurring on the data processing system so that each partition operates independently as if each partition is on a separate physical computer.

19. The method of claim 18, wherein each partition in the number of partitions formed is assigned to a different number of cores from the plurality of cores within the data processing system.

20. The method of claim 18,
- wherein configuration of the data processing system does not occur again until one of a reboot or a cycling of power of the data processing system;
- wherein the number of resources comprises a hypervisor and a number of virtual machines;
- wherein the number of partitions comprises a hypervisor and a number of virtual machines; and
- wherein each partition of the number of partitions is a hardware partition.

* * * * *